United States Patent
Vakayil et al.

(10) Patent No.: US 9,505,022 B2
(45) Date of Patent: Nov. 29, 2016

(54) SURFACE TREATMENT METHOD FOR MAKING HIGH DURABILITY UNIVERSAL TITANIUM DIOXIDE RUTILE PIGMENT

(71) Applicant: The National Titanium Dioxide Co. Ltd. (CRISTAL), Jeddah (SA)

(72) Inventors: Ahmed Yasir Vakayil, Jeddah (SA); Ahmad I. Jomha, Jeddah (SA)

(73) Assignee: The National Titanium Dioxide Co. Ltd. (Cristal), Jeddah (SA)

( * ) Notice: Subject to any disclaimer, the term of this patent is extended or adjusted under 35 U.S.C. 154(b) by 689 days.

(21) Appl. No.: 13/693,667

(22) Filed: Dec. 4, 2012

(65) Prior Publication Data
US 2014/0154413 A1    Jun. 5, 2014

(51) Int. Cl.
| | | |
|---|---|---|
| B05D 5/12 | (2006.01) | |
| B05D 1/18 | (2006.01) | |
| C09C 1/36 | (2006.01) | |
| C09D 7/12 | (2006.01) | |

(52) U.S. Cl.
CPC ............... B05D 1/18 (2013.01); C09C 1/3661 (2013.01); C09D 7/1225 (2013.01); C01P 2002/80 (2013.01); C01P 2002/84 (2013.01)

(58) Field of Classification Search
USPC ........................................................ 427/212
See application file for complete search history.

(56) References Cited

U.S. PATENT DOCUMENTS

| | | | |
|---|---|---|---|
| 3,437,502 A | 4/1969 | Werner | |
| 3,981,737 A | 9/1976 | Evilampi et al. | |
| 4,239,548 A | 12/1980 | Barnard et al. | |
| 4,405,376 A | 9/1983 | Matsunaga et al. | |
| 4,447,271 A | 5/1984 | Howard et al. | |
| 4,450,012 A | 5/1984 | Messer et al. | |
| 5,165,995 A | 11/1992 | Losoi | |
| 5,203,916 A | 4/1993 | Green et al. | |
| 5,554,216 A | 9/1996 | Baidins et al. | |
| 5,700,318 A | 12/1997 | Brand et al. | |
| 5,730,796 A | 3/1998 | Brand et al. | |
| 5,792,250 A | 8/1998 | Braun et al. | |
| 5,824,145 A | 10/1998 | Marganski et al. | |
| 5,908,498 A | 6/1999 | Kauffman et al. | |
| 5,976,237 A | 11/1999 | Halko et al. | |
| 6,342,099 B1 * | 1/2002 | Hiew et al. | ........... 106/443 |
| 6,656,261 B2 | 12/2003 | Tear et al. | |
| 7,135,065 B2 | 11/2006 | Drews-Nicolai et al. | |
| 7,238,231 B1 | 7/2007 | Craig et al. | |
| 8,105,432 B2 | 1/2012 | Bettler et al. | |
| 2005/0239921 A1 * | 10/2005 | Birmingham et al. | ....... 523/210 |
| 2006/0034739 A1 * | 2/2006 | Drews-Nicolai et al. | ........ 423/1 |
| 2009/0087556 A1 | 4/2009 | Bashir et al. | |
| 2013/0028948 A1 * | 1/2013 | Yamamoto et al. | .......... 424/401 |

FOREIGN PATENT DOCUMENTS

| | | |
|---|---|---|
| DE | 748 826 C | 11/1944 |
| EP | 0 078 632 A1 | 11/1983 |
| EP | 0 078 633 A1 | 11/1983 |
| GB | 2108098 | 5/1983 |
| WO | WO 2011/102214 * | 8/2011 |
| WO | WO 2011/102214 A1 | 8/2011 |

OTHER PUBLICATIONS

Extended European Search Report for Application No. EP 13168620.6 published by the EPO, with a completion date of Nov. 21, 2013, including corresponding Communication, Annex, and 4-page EPO Form 1703.

* cited by examiner

*Primary Examiner* — Austin Murata
(74) *Attorney, Agent, or Firm* — Kilyk & Bowersox

(57) ABSTRACT

A method is provided for the wet surface treatment of titanium dioxide, in order to produce durable universal grade titanium dioxide rutile pigment with superior optical properties. The method is characterized in that, a hydrous zirconia and silica composite layer is co-precipitated at acidic pH. Then, a layer of alumina is precipitated under a range of pH required for complete precipitation above the initial composite layer. The upper pH limit of the slurry during the alumina precipitation can be well controlled to avoid any chance for dissolution or damage of the composite zirconia-silica layer formed. Zirconia-silica composite layers and alumina thus precipitated advantageously improve the competence of the layers formed over a $TiO_2$ base and provide improved durability with superior optical performance. The total surface treatment cycle time and chemicals used are minimal compared to conventional methods. Improvements in throughput and washing efficiency are also realized.

15 Claims, No Drawings

SURFACE TREATMENT METHOD FOR MAKING HIGH DURABILITY UNIVERSAL TITANIUM DIOXIDE RUTILE PIGMENT

FIELD

The present invention relates to the field of surface treatment of $TiO_2$ pigments to produce durable multipurpose $TiO_2$ with superior optical properties.

BACKGROUND

It is well known that titanium dioxide absorbs UV radiation and catalyzes the degradation of surrounding organic media. This undesirable photo-catalytic reaction can be arrested before titanium dioxide is used as a white pigment in paints, coatings, and plastics. Photo-irradiation of $TiO_2$ with photon energy greater than the band gap energy excites the electron of the valance band to the conduction band, creating holes in the valence band and high energy electrons in the conduction band. Consequently, following irradiation, the $TiO_2$ acts as either an electron donor or a hole donor to reduce or oxidize the organic compounds present in the surrounding media by forming highly reactive free radicals. These free radicals, if not neutralized or prevented from formation, initiate the degradation of the binder in paint systems, causing chalking and fading. It is known that the photo-activity of $TiO_2$ can be reduced by subjecting it to inorganic post treatment using zirconia, silica, or alumina. The inorganic post treatment also enhances the dispersion and optical properties of the $TiO_2$. It is further known that the precipitation conditions and nature of treatment layers have a significant influence on the durability and optical performance of the treated pigment.

Several examples of zirconia and alumina as components of a post treatment process are described in many patents, but the treatment conditions adopted and the precipitation of a composite layer of zirconia and silica are not disclosed.

Great Britain Patent No. GB 2,108,098 describes the use of a hydrous oxide layer of zirconia as a first layer on $TiO_2$, a second layer of dense amorphous silica, and a final layer of a hydrous oxide of alumina, to improve resistance to photochemical degradation. Both the zirconia and silica layers are precipitated separately and the alumina precipitation is done at alkaline pH.

Another approach is described in U.S. Pat. No. 3,437,502, which describes a highly durable $TiO_2$ pigment made by treating $TiO_2$ with a dense silica layer and an alumina layer precipitated at a pH above 4.5. The pH is set at pH 6 to 8 by adding either sulfuric acid or NaOH.

U.S. Pat. No. 3,981,737 describes an alumina treatment at alkaline pH in the presence of vanadium ions to form light-resistant $TiO_2$. The alumina is added to a pre-set alkaline slurry.

U.S. Pat. No. 4,239,548 describes a light stable/fast $TiO_2$ pigment for paper laminates, in which alumina is precipitated at pH 5 to 7 by adding aluminum sulphate. NaOH is used for setting the pH and other ions like cerium and phosphate are also added.

U.S. Pat. No. 4,450,012 describes coated mixed phase rutile pigments having a first coating of an oxide or hydrated oxide of titanium, zirconium, tin, or a mixture thereof, and a subsequent coating of an oxide or hydroxide of aluminum. The pigments resist flocculation when formulated in lacquers hardened with acid catalysts.

U.S. Pat. No. 4,405,376 describes a titanium dioxide pigment along with a process for producing the pigment, wherein the pigment displays improved durability and dispersibility and comprises a pigmentary titanium dioxide core particle, an inner coating of hydrous oxides of tin and zirconium, and an outer coating of a hydrous oxide of aluminum. NaOH is used for raising the pH.

U.S. Pat. No. 4,447,271 describes a highly durable and weather-resistant pigment made by treating $TiO_2$ with a dense amorphous silica and then with a hydrous oxide of zirconia. Optionally, an outer coating of a hydrous oxide of alumina is provided. The silica precipitation is done at alkaline pH (pH 7.5 to 9.4). The alumina layer is precipitated at pH 10.0 to 10.5.

U.S. Pat. No. 5,203,916 describes a pigmentary titanium composite possessing good durability and excellent optical properties, consisting essentially of a particulate titanium dioxide base, a hydrous zirconium oxide layer deposited on the titanium dioxide base at pH 8, and a hydrous alumina layer deposited on the hydrous zirconium oxide layer. A process for producing such a pigment is also described.

U.S. Pat. No. 5,700,318 describes a durable pigment for plastic applications, and methods of precipitating different forms of alumina at different pH levels. The pH is reduced to 3.5 after adding a first portion of aluminate. Then, the pH is increased to 5.75 by adding NaOH before adding a second portion of aluminate. The pH is then increased to 8 by using NaOH before adding a final portion of aluminate. Neither a silica layer nor a zirconia layer is used in addition to the alumina layer.

U.S. Pat. No. 5,730,796 describes a highly durable pigment in which $TiO_2$ is treated with ceria and silica and then with alumina. An aluminate solution is added at pH 7.5 and the pH is increased to 10.5 after the addition, for precipitation.

U.S. Pat. No. 5,554,216 describes a high gloss, highly durable pigment production method wherein alumina is precipitated in the presence of a very small amount of molybdenum at a pH of from 6 to 10.

U.S. Pat. No. 5,976,237 describes the production of durable $TiO_2$ pigment with good dispersibility and optical properties for use in plastics and paint compositions. Three layers of coatings are described. The first coating is made of silica or alumina, an optional second coating is made of zirconia or tin oxide or ceria or titania, and the third coating is made of alumina. The alumina treatment is conducted at a different pH. Sodium aluminate is added to an acidic slurry and the pH is adjusted to 3.5 and maintained under digestion, then to 5.75 and maintained under digestion, then to 6.5 and maintained under digestion, and finally to 7.0 and maintained under digestion. The pH adjustment at each step is done using NaOH.

U.S. Pat. No. 6,656,261 B2 describes substantially sulfate-free titanium dioxide pigments with improved gloss and/or durability and comprising alumina, zirconia, and optionally, phosphate compounds. Methods of making these pigments are also described. These pigments are useful in the manufacture of paints and plastics. This patent describes a method comprising wet treating titanium dioxide with, first, an alumina compound to form an alumina layer, followed sequentially by wet treatment with a zirconia compound to form a zirconia layer. Nothing is taught as to the expected outcome. The description of an outer zirconia layer is in sharp contrast with the other references described herein, which describe the use of a zirconia inorganic oxide treatment. The deposition of zirconia is carried out as an intermediate step only and a final alumina treatment is applied in order to ensure the pigment's compatibility with modern ingredients used in paints, plastics, and paper, for instance.

U.S. Pat. No. 7,135,065 describes a post treatment of $TiO_2$ to obtain weather-resistant pigment with good optical properties. The pigment is coated sequentially with hydrous tin and zirconium. At least one other component from silicon and titanium is additionally precipitated on the pigment particle surface. Then, a final layer of alumina is precipitated. The post treatment components are added to the aqueous $TiO_2$ suspension either in an acidic pH range (pH 3.0) or in an alkaline pH range (pH 10.0). The pH value is subsequently set to 6.0 to 8.0 before sodium aluminate/ aluminum sulphate addition. The method incorporates hydrous $SnO_2$ together with $ZrO_2$, and then a coating of silica or alumina or titania with zirconia, and then a final layer of alumina. The patent describes that $SnO_2$ must be added prior to $ZrO_2$, and then the other chemicals, in sequence, to get the required weather resistance.

U.S. Pat. No. 7,238,231 describes a zirconia treated TiO2 pigment in which the zirconia treatment is done after re-dispersing a washed semisolid filter cake of silica and alumina-treated TiO2 pigment using ammonium zirconyl carbonate. The resultant pigment is then spray dried.

U.S. Pat. No. 8,105,432 describes a method for making high durability and easily dispersed pigment by adding citric acid to stabilise amorphous alumina. The combination of silica and citric acid-stabilized alumina are described as the cause of improved dispersion and durability. The precipitation of silica and alumina is done at various controlled pH levels by using either NaOH or HCl at 95° C.

Despite extensive prior art targeting the improvement in durability of titanium dioxide, either by depositing zirconia or tin and zirconia to titanium dioxide pigments, or by using alumina stabilised by organic acid, further improvements are continually being sought, especially due to the escalating raw material cost of zirconium chemicals. In none of the aforementioned references are the benefits of a lower zirconia content described, let alone that are achieved by treatment with a zirconia-silica composite, to result in the manufacture of a multipurpose pigment. In addition to these benefits, a reduced number of treatment steps and less consumption of acid and base are among the other advantages achieved by the method of the present invention disclosed below.

SUMMARY

The present invention provides a method for the post treatment of $TiO_2$ pigments in acidic solutions to form a composite layer of hydrous zirconia and silica on the pigments. A second layer of hydrous alumina can be precipitated at a wide range of pH levels using sodium aluminate without using NaOH. The resulting slurry can be maintained at an alkaline pH for the purpose of stabilising the dense alumina layer. The temperature of the system can be kept at ≥60° C. during the precipitation stages of both the zirconia-silica composite layer and the alumina layer in order to ensure completeness of the precipitation. The resultant pigment shows improved durability and superior optical properties.

DETAILED DESCRIPTION

Against the foregoing descriptions, the present invention relates to a method for the post treatment of rutile titanium dioxide, for example, produced through the chloride route, to form titanium dioxide pigments having improved durability and better optical properties.

It is a primary objective of the present invention to provide a method for producing titanium dioxide pigments that possess improved durability and good and balanced optical properties.

The present invention also provides a method for treating titanium dioxide pigments with a hydrous zirconia-silica composite and with hydrous alumina, wherein the alumina is precipitated under a wide range of pH levels. In order to ensure completion of precipitation, the titanium dioxide suspension can be heated to at least 60° C. prior to the addition of zirconia, silica, and alumina precursors.

The present invention provides a method for the surface treatment of titanium dioxide pigment with a hydrous zirconia-silica composite at an acidic pH, for example, at a pH of from 1.5 to 5.5, for example, at a pH of from 2.0 to 4.5. The method can also involve a single stage hydrous alumina surface treatment at a wide range of pH values, for example, anywhere in the range of from 2.0 to 8.5.

The titanium dioxide pigment produced in accordance with the present invention can be used as a multipurpose pigment having improved durability with good optical performance, and can be used both in interior and exterior paints and coatings.

The starting titanium dioxide pigment can be a base material produced through the familiar chloride process. The pigment can be present in rutile form containing, for example, from 0.7% by weight to 1% by weight co-burned alumina inside the crystal lattice, based on the weight of the $TiO_2$.

An aqueous suspension of base titanium dioxide material can be used. The suspension can be at an acidic pH, for example, at a pH of from 3.0 to 5.0, of from 3.5 to 4.5, or of about 4.0, or at an alkaline pH, for example, at a pH of 9.0 or higher or about 10.0 or higher. Prior to the addition of zirconia, however, the pH can be adjusted to be in an acidic range, for example, of from 4.0 to 6.0, or at about 5.0 in the case of an alkaline starting suspension.

The method can comprise a subsequent step wherein an aqueous solution of post treatment component zirconia is added to the suspension, followed by the silica precursor. A hydrous zirconia-silica composite layer can be precipitated by maintaining the suspension at a temperature above 50° C., for example, at 60° C. or higher, at 65° C. or higher, or at 70° C. or higher. The temperature of above 50° C. can be maintained for at least 5 minutes, for at least 10 minutes, for at least 15 minutes, or until precipitation is substantially or fully completed.

Subsequently, a water soluble alkaline alumina compound can be added without any pH adjustments. The precipitation of a final layer of alumina can be accomplished at a wide range of pH, and finally the pH can be maintained at 8 to 8.5 and at a temperature of above 50° C., for example, at 60° C. Those persons skilled in the art are familiar with the quantity of acid required for pH control. During this step, the pH can be maintained at 9.5 or lower, or at another pH so that incomplete formation of the alumina layer does not occur or leaching-out of the zirconia-silica layer. A retention time of 5 to 45 minutes, 10 to 30 minutes, or 10 to 15 minutes, for example, can be used to ensure the completion of precipitation.

Coated $TiO_2$ particles can then be separated from the aqueous suspension by filtration, before washing with distilled water until the final pH of the filtrate is from about 6 to 7. The filtered, treated $TiO_2$ powder can then be dried, ground, and micronized to reach any specific particle size. Filtering and washing of the powder can be easily facilitated and a final washing can be achieved with less amounts of water.

The layers of zirconia-silica composite and alumina precipitated under the controlled conditions mentioned above can be useful in avoiding any chance for dissolution or damage of these layers. The order of addition of zirconia-silica and alumina can be important as the zirconia-silica composite layer can be used directly on the $TiO_2$ base to induce photo-durability. Zirconia-silica composite layers and alumina layers thus precipitated improve the quality of the layer formed over the $TiO_2$ base and thereby improve the properties of the pigments.

EXAMPLES

The invention will be better understood by reference to the following illustrative examples. Properties of the pigments prepared in the examples are shown in Table 1 below. All percentages are based on weight basis, were analyzed by XRF (X-ray fluorescence) as their oxides, and refer to the $TiO_2$ base material.

Example 1

A wet milled slurry was formed of $TiO_2$ base material having 0.7% by weight to 1% by weight alumina within the lattice, manufactured by the chloride process. The slurry had a $TiO_2$ concentration of 400 g/l and was adjusted to a pH value of 5.0 with $H_2SO_4$ at 60° C. While stirring, 0.5% by weight of $ZrO_2$, based on the weight of the $TiO_2$, was added to the suspension in the form of either zirconium oxysulphate solution or zirconium oxychloride solution (15% by weight $ZrO_2$). Immediately afterwards, 0.5% by weight $SiO_2$, based on the weight of the $TiO_2$, was added as sodium silicate. The resulting slurry was digested for 15 minutes at the same temperature. Subsequently, 2.5% by weight of $Al_2O_3$, based on the weight of the $TiO_2$, was added in the form of sodium aluminate, and the pH was maintained at 8.0 to 8.5 by adding $H_2SO_4$. The resulting slurry was digested for another 15 minutes at the same temperature and the final pH value was adjusted to 6.5 to 7.0. Water soluble salts were then washed off and the resulting product was dried at 110° C. and milled.

The chemical composition of the product was analyzed by XRF and the durability was estimated by UV Reactivity Rating, whereby, the higher the rating, the better the durability.

Example 2

Example 2 was similar to Example 1 except that the $ZrO_2$ percentage used was 0.25% by weight based on the weight of the $TiO_2$.

Example 3

Example 3 was similar to Example 2 except that the $SiO_2$ percentage used was 0.25% by weight based on the weight of the $TiO_2$.

Example 4

Example 4 was similar to Example 2 except that the $SiO_2$ percentage used was 0.75% by weight based on the weight of the $TiO_2$.

Example 5

Example 5 was similar to Example 2 except that the $SiO_2$ percentage used was 1% by weight based on the weight of the $TiO_2$.

Comparative Example 1

Comparative Example 1 was similar to Example 1, except that no silica was added.

Comparative Example 2

Comparative Example 2 was similar to Example 2 except that no silica was added.

Test Method

Samples from above Examples and Comparative Examples were tested for UV reactivity rating as per the procedure described below.

1. Ultraviolet Reactivity Rating (UVRR)

The durability of a pigment is usually measured as resistance to chalking over a long term, for example, about two years of outdoor exposure. Tests are typically carried out on paint containing the pigment. However, chalk/fade/degradation of exterior paints containing $TiO_2$ pigment can also be attributed to the photo-oxidation of organic binder catalyzed by the titanium dioxide under ultraviolet radiation in the presence of oxygen and water vapor, as reported in H. B Clark, "Titanium Dioxide Pigments," Treatise on Coatings, Vol. 3, Pigments, Marcel Dekker, 1975, which is incorporated herein in its entirety by reference. So, the Ultraviolet Reactivity Rating (UVRR) of the pigments produced in the present Examples and Comparative Examples was measured as described in U.S. Pat. Nos. 5,554,216 and 5,824,145, which are also incorporated herein in their entireties by reference. The test used was based on the $TiO_2$ catalyzed reduction of lead carbonate to lead metal under UV radiation. An air sealed dispersion of non-durable pigment and lead carbonate in an organic medium was used and turns from white to almost black by exposure to ultraviolet light. With a durable pigment, however, the paste turns to light gray. The exposure used was for 7 hours and the relative ultraviolet reactivity rating was calculated against a reference sample of the same composition. The value was then converted to a durability rating. Higher rating values represent higher durability.

The test results from testing the Examples and Comparative Examples are shown in Table 1 below. Reproducibility and repeatability of the experiments were confirmed and all the values given in the Table are representative of at least 3 duplicate experiments.

TABLE 1

| Example | $ZrO_2$ (%) | $SiO_2$ (%) | $Al_2O_3$ (%) | *Durability rating |
|---|---|---|---|---|
| 1 | 0.5 | 0.5 | 3.5 | 10 |
| 2 | 0.25 | 0.5 | 3.5 | 10 |

TABLE 1-continued

| Example | ZrO$_2$ (%) | SiO$_2$ (%) | Al$_2$O$_3$ (%) | *Durability rating |
|---|---|---|---|---|
| 3 | 0.25 | 0.25 | 3.5 | 7.5 |
| 4 | 0.25 | 0.75 | 3.5 | 10 |
| 5 | 0.25 | 1.0 | 3.5 | 10 |
| Comparative example 1 | 0.5 | 0 | 3.5 | 7.5 |
| Comparative example 2 | 0.25 | 0 | 3.5 | 7 |

*The higher the rating values, the higher the durability

It is very obvious from the results that, with respect to the Comparative Examples, the durability improved in all of the Examples of the present invention except Example 3.

It can be seen that the addition of silica substantially improved the durability.

In Example 5, although the rating was higher than in the Comparative Examples, the optical performance, particularly the gloss, was lower.

It is also seen that the methods used in the Examples according to the present invention were very easy to carry out, and short. As a consequence, the Examples provided an increase in throughput.

As described herein, the method is characterized by the fact that no caustic was used. As a result, fewer ions are present in the resulting product and therefore the washing time and resources were improved significantly.

It is apparent that variations and modifications are possible to the illustrated invention. It is therefore to be understood that the appended claims be construed as encompassing all features of patentable novelty which reside in present invention, including all features which would be treated as equivalent thereof by those skilled in the art to which the invention pertains. All US patents and publications referred to herein are hereby incorporated by reference in their entireties.

What is claimed is:

1. A method for post treatment of titanium dioxide pigment particles comprising, in sequence:
    a) preparing an aqueous slurry of titanium dioxide pigment core particles with a pH value of from 4.0 to 6.0,
    b) adding to the aqueous slurry of titanium dioxide pigment core particles a sufficient quantity of water soluble compounds of zirconia and silica, in sequence, to precipitate a hydrous zirconia-silica composite layer on the core particles and form a first mixture, the adding comprising adding the water soluble compounds of zirconia and silica without the addition of any pH-adjusting compounds other than the water soluble compounds of zirconia and silica,
    c) digesting the first mixture for 10 to 30 minutes to complete the precipitation and form a suspension,
    d) adding a sufficient quantity of water soluble alkaline alumina compound to the suspension in a single step to form a second mixture, the adding a sufficient quantity comprising adding the water soluble alkaline alumina compound without the addition of any pH-adjusting compound other than the water soluble alkaline alumina compound, wherein steps b), c), and d) are carried out in order without adding any pH-adjusting compounds, during or between steps b), c), and d), other than the water soluble compounds of zirconia and silica added in step b) and the water soluble alkaline alumina compound added in step d),
    e) after the single step addition of step d), adjusting the pH of the second mixture, if needed, to achieve a pH of the second mixture of from 8.0 to 8.5,
    f) digesting the second mixture resulting from step e) for 10 to 30 minutes to complete precipitation of a hydrous alumina layer on the hydrous zirconia-silica composite layer and to form a second suspension comprising a multi-layered pigment,
    g) adjusting the pH of the second suspension, if needed, to achieve a pH value of from 6.0 to 8.0,
    h) filtering the second suspension resulting from step g), and
    i) drying the multi-layered pigment.

2. The method of claim 1, further comprising mixing the multi-layered pigment with an organic polyol, wherein the drying comprises drying in a spin flash drier at a temperature of at least 120° C.

3. The method of claim 1, wherein step b) comprises adding 0.1% by weight to 0.5% by weight of the zirconia compound, calculated as ZrO$_2$% by weight based on the weight of TiO$_2$ pigment core particles in the slurry.

4. The method of claim 3, wherein the zirconia compound used is selected from the group consisting of zirconium ortho sulphate, zirconium ortho chloride, and combinations thereof.

5. The method of claim 1, wherein step b) comprises adding the silica compound in an amount of from 0.25% by weight to 1% by weight calculated as SiO$_2$% by weight based on the weight of TiO$_2$ pigment core particles in the slurry.

6. The method of claim 5, wherein the silica compound comprises a water soluble alkaline sodium silicate.

7. The method of claim 1, wherein step d) comprises adding the water soluble alkaline alumina compound in an amount of from 2% by weight to 4.0% by weight calculated as Al$_2$O$_3$% by weight based on the weight of the TiO$_2$ pigment core particles in the slurry.

8. The method of claim 7, wherein the water soluble alkaline alumina compound comprises a water soluble alkaline sodium aluminate.

9. The method of claim 8, further comprising adjusting the pH value of the second mixture to be from 8.0 to 8.5 after adding the water soluble alkaline sodium aluminate.

10. The method of claim 8, wherein step d) further comprises increasing the pH to 8.0 solely by adding the water soluble alkaline sodium aluminate without adding sodium hydroxide solution.

11. The method of claim 7, wherein the hydrous alumina layer is precipitated as a layer on top of the hydrous zirconia-silica composite layer.

12. The method of claim 1, wherein, in step f), the digestion is carried out at a temperature of from 50° C. to 70° C.

13. The method of claim 1, wherein step g) comprises adjusting the pH to set a final pH value of the second suspension to a value of from 6.5 to 7.5.

14. The method of claim 1, further comprising adding the resultant multi-layered pigment to a multipurpose paint or coating material.

15. A method for post treatment of titanium dioxide pigment particles comprising, in sequence:
    a) preparing an aqueous slurry of titanium dioxide pigment core particles with a pH value of from 4.0 to 6.0,
    b) adding to the aqueous slurry of titanium dioxide pigment core particles a sufficient quantity of water soluble compounds of first zirconia and then silica, in that order, to precipitate a hydrous zirconia-silica composite layer directly on the titanium dioxide of the core particles and form a first mixture, the adding comprising adding the water soluble compounds of zirconia and silica without the addition of any pH-adjusting compounds other than the water soluble compounds of zirconia and silica, c) digesting the first mixture for 10 to 30 minutes to complete the precipitation and form a suspension, d) then, adding a sufficient quantity of water soluble alkaline alumina compound to the suspension in a single step, to form a second mixture, the adding a sufficient quantity comprising adding the water soluble alkaline alumina compound without the addition of any pH-adjusting compound other than the water soluble alkaline alumina compound, wherein steps b), c), and d) are carried out in order without adding any pH-adjusting compounds, during or between steps b), c), and d), other than the water soluble compounds of zirconia and silica added in step b) and the water soluble alkaline alumina compound added in step d), e) after the single step addition of step d), adjusting the pH of the second mixture, if needed, to achieve a pH of the second mixture of from 8.0 to 8.5, f) digesting the second mixture resulting from step e) for 10 to 30 minutes to complete precipitation of a hydrous alumina layer on the hydrous zirconia-silica composite layer and to form a second suspension comprising a multi-layered pigment, g) adjusting the pH of the second suspension, if needed, to achieve a pH value of from 6.0 to 7.0, h) filtering the second suspension resulting from step g), and i) drying the multi-layered pigment.

* * * * *